3,298,958
GELATIN DESICCANT TABLETS
Robert A. Mosher, Seymour, Ind., assignor to Standard Oil Company, Chicago, Ill., a corporation of Indiana
No Drawing. Filed Sept. 21, 1962, Ser. No. 225,371
5 Claims. (Cl. 252—194)

This invention relates to desiccants and particularly to a consolidated desiccant gelatin mass.

It is well known to remove water vapor from a gaseous atmosphere by contacting the atmosphere with the solid material known as desiccants. Most commonly, the desiccants are solid materials such as activated charcoal, silica gel or alumina. For some purposes, organic desiccants are desirable. Cotton, wool and silk are effective desiccants, but have low capacities for water; these materials have capacities on the order of 1–2% by weight of the desiccant.

Ammonium nitrate propellant compositions which consist of ammonium nitrate and organic binder material and a combustion catalyst are moisture sensitive. Rocket motors and gas generators containing such propellants frequently are stored for long periods of time. It has been observed that even after considerable precautions are taken to seal the motors and generators that, over a period of time, there is seepage of the atmosphere into the motor and generator; the atmospheric humidity is then adsorbed by the ammonium nitrate with deleterious effects on the propellant. Adsorption of water vapor from the air leaking into the container is even more harmful to the igniter components such as black powder.

The water vapor leakage into the container can be adsorbed by having a suitable desiccant positioned in the container. Temperatures of the propellants and the igniter components frequently exceed 120° F. in ordinary storage; some stability tests operate at temperatures as high as 290° F. It has been observed that some desiccants react with the propellant and igniter components under these conditions with harmful effects on the performance characteristics or storage characteristics of the rocket motor or gas generator unit.

These desiccants are forced out of the combustion chamber by the gases. The inorganic desiccants are abrasive and damage the nozzle at the exit of the combustion chamber and result in erratic pressure maintenance in the chamber. Even the organic desiccants can be undersirable because their combustion products contain solid ash material which can be abrasive, but mainly causes a build-up of solid deposits in the turbines driven by the exhaust gases.

It has been discovered that gelatin which has been reduced in water content below that present after normal manufacturing procedures is extremely effective for adsorbing water and particularly water vapor from a gaseous atmosphere. Gelatin useful as a desiccant has a water content substantially less than 9%. Substantially anhydrous gelatin—which has not been known heretofore—is a very efficient desiccant for removing water vapor from a gaseous atmosphere having a relative humidity of 40% or less. This desiccant can be readily regenerated for reuse by the same procedure used in obtaining gelatin of reduced water content from the commercial product. The water vapor content of the gaseous atmosphere can be decreased by exposing the atmosphere to substantially anhydrous gelatin; sufficient gelatin is used and a sufficient time of exposure is given to decrease the water vapor content to the desired point. This discovery is the subject matter of U.S. patent application, Serial No. 219,734, filed August 27, 1962, for Messrs. Robert A. Mosher and Wayne A. Proell, and entitled, "Gelatin Desiccant" now abandoned.

Gas generators for military purposes are subjected to many tests to insure operability in field conditions. One of these is a vibration test wherein the gas generator is subjected to ten to two thousand cycles per second on a programmed basis until a vibration resonance frequency for the generator has been located. The generator is then vibrated at the resonance frequency for 60 minutes. At the end of this time, the generator is inspected and fired. It has been found that tablets of compacted gelatin powder used for desiccant purposes within gas generators disintegrated during the vibration test.

A main object of the invention is a strong organic desiccant mass capable of adsorbing relatively large amounts of water vapor, i.e., of high capacity and capable of being regenerated and reused, and suitable for use with ammonium nitrate propellants. Other objects will become apparent in the course of the detailed description of the invention.

It has been discovered that a desiccant mass of gelatin can be prepared which does pass the military vibration test and other tests for components of military gas generators. This desiccant mass is obtained by consolidating a gelatin compact by treatment with water, at controlled conditions, prior to the dehydration treatment which produces desiccant gelatin. The consolidated desiccant mass of the invention consists essentially of gelatin whose water content is substantially less than 9 weight percent. Gelatin solids are compacted to form a mass. The compacted gelatin solids are treated with a solution of water and organic solvent; sufficient solution is used and the treating is continued for a time sufficient to swell and consolidate the compacted gelatin solids.

The compacted gelatin solids may be formed from any of the types of gelatin available. The compact may have the shape desired for the final gelatin desiccant mass or the consolidated compact may then be fabricated to the final desired mass shape. A large consolidated mass can be prepared and this broken up into smaller sizes or granules. Usually the consolidated desiccant mass will be in the form of a tablet or pill.

The gelatin soldi, which is the source of the organic desiccant of the invention, may be either food grade, or technical grade, or glue grade obtained by selective hydrolysis of collagen, the major intercellular protein constituent of the white connective tissue of animal skins and bones. Pure, dry commercial gelatin is a tasteless, odorless, hard, transparent, brittle, vitriform solid, very faint yellow to amber in color and is available in the form of powder, chips or plates.

The strong consolidated desiccant gelatin mass is obtained by treating the compacted gelatin solids with a solution of water in an inorganic solvent. It is thought that the consolidation is the result of action of water on the gelatin. It has been observed that treating the gelatin compact with water alone results in swelling, softening of the compact to an extent that it cannot be used for the preparation of a desiccant mass. It has been discovered that the use of a solution of water in an organic solvent permits control of the consolidation treatment to the degree that the treated compact can then be readily dehydrated to obtain a strong consolidated desiccant gelatin mass. Any organic compound having substantial solubility for water and which does not attack the gelatin may be used in combination with water for the consolidation treatment. It has been found that ketones, alcohols, and esters of alcohols and alkanoic acids are especially suitable for use as solvents for the water. It is to be understood that only those ketones, alcohols and esters can be used which have substantial solubility for water and also can be readily removed from the consolidated gelatin solids during the subsequent dehydration step, i.e., these organic solvents have a boiling point below about 105° C. Illustrative of the especially suitable organic solvents are acetone, methyl ethyl ketone, diethyl ketone, methanol, ethanol, propanol-1, propanol-2, methyl acetate, ethyl acetate, and isopropyl acetate.

The solution of water and organic solvent should contain sufficient water to accomplish the consolidation in the desired time at the particular temperature of treatment. The treating operation is preferably carried out at normal atmospheric temperatures such as 15.5° C.–37.8° C. (60° F.–100° F.). The time needed for the consolidation treatment can be roughly determined by the visual appearance of the compact to the eye. The compact swells and changes its surface appearance. To the touch, the treated compact is soft—relative to the compact introduced into the treating zone. Two or three test batches will establish, for any combination of water and organic solvent at a particular set of treating conditions, the time needed to develop maximum strength of the consolidated desiccant gelatin mass.

When the treating solution is made up of water and either ketone, alcohol or esters as defined above, the solution is made up of 5–40 volume percent of water and 95–60 volume percent of defined solvent.

In the case of water-acetone solutions, it has been observed that better results are obtained with a solution having 10–40 volume percent water and 90–60 volume percent acetone. When using water in ketone, alcohol or ester solutions, sufficient solution is used to afford 10–50 weight percent of water based on the compact being treated. A suitable treating time under these conditions at ordinary atmospheric temperatures is about 15–45 minutes.

Commercial gelatin contains 9–12% moisture. Gelatin useful as a desiccant has a water content substantially less than 9% by weight. More usually, desiccant quality gelatin contains 0–5% by weight of water. When the desiccant is to be used in situations where the atmosphere has low humidity and particularly when the relative humidity is 40% or less, it is preferred to use gelatin having a water content of 0–2 weight percent.

Desiccant gelatin is obtainable by heating ordinary commercial gelatin, gelatin compacts, or consolidated gelatin masses at a temperature, for example, of 230° F. under vacuum until the water content has been decreased to the desired level. A combination of temperature and vacuum is used which permits removal of the water content in the desired time without significant degradation of the gelatin. Gelatin which has been used as a desiccant can be restored to its original activity by heating in the same manner as in the preparation of desiccant gelatin from the commercial gelatin.

It has been found that tablets prepared by compressing powdered gelatin, which are then converted to desiccant material, are relatively easy to use and are effective in water removal from gaseous atmospheres. The tablet form makes it convenient to introduce the desiccant into containers such as rocket motors, gas generators and particularly igniter units. In the case of igniter units, the desiccant gelatin tablets are intermingled with the gun powder or other ignition material present in the igniter unit. This is particularly effective when the igniter material is the moisture sensitive item which needs protection.

*Illustrations*

Commercial technical grade powdered gelatin was formed into tablets by a commercial tableting machine providing a mold pressure of approximately 6,000 p.s.i. The pressure was maintained on the mold for approximately 0.1 second. The compacted gelatin tablets were ½ inch in diameter and ⅛ inch thick. The molding operation was carried out at 20° C.

These tablets, as formed, had a water content of about 10 weight percent. The tablets were converted to desiccant gelatin: the dehydration was carried out in a vacuum oven, held at 28 inches of mercury vacuum, and a temperature of 105° C. The water content of the tablets was reduced to about 1%.

These tablets were introduced into an igniter unit containing both black powder and ammonium nitrate propellant pills as the ignition components. The igniter cup was sealed with a Mylar polyester sheet and a polyethylene cover cap. The black powder is ignitible by electrical squibs. When the igniter operates, the Mylar sheet and polyethylene cap are blown from the cup and the black powder and pills distributed throughout the gas generator chamber.

A gas generator was prepared including the above igniter assembly. This gas generator was given the vibration test previously described. Inspection of the igniter assembly after the test showed a considerable fragmentation of tablets and some complete disintegration of tablets.

Other tablets as prepared above were consolidated by treatment with a water-acetone solution containing 20 volume percent of water. In this instance, sufficient solution was used to afford 40% by weight of water based on the compacted gelatin tablets treated. The treating was carried out at room temperature at about 25° C. and was continued for a time of 30 minutes. The solution was decanted from the treated tablets. Analysis of the decanted liquid indicated that the water had been removed from the solution to a substantial extent. The treated tablets were somewhat swollen in size; were soft to the touch and had a small tendency to agglomerate. However, the tablets were easily separated without causing any deformation.

The treated tablets were placed in a vacuum oven held at 28 inches of mercury vacuum; after four hours at 100° C., the tablets were anhydrous. The consolidated desiccant tablets were strong to finger pressure and were essentially the same size and shape as the compacted gelatin powder.

Igniter units were made up using the consolidated tablets and introduced into gas generators just as the "as is" tablets previously described above. These generators were subjected to the military vibration test; inspection of the igniter units after the test showed no fragmentation or even dusting of the consolidated desiccant tablets. (The consolidated desiccant tablets of the invention are now in standard use for certain types of military gas generators which require extreme stability of the tablets.)

Thus having described the invention, what is claimed is:

1. As a desiccant for a solid propellant, a consolidated desiccant mass which consists essentially of gelatin having a water content substantially less than 9 weight percent, said mass having been formed from compacted gelatin solids, said compacted solids having been treated with a solution of 5–40 volume percent of water in 95–60 volume percent of an organic solvent to swell and consolidate the compacted solids, said solvent having substantial solubility for water and selected from at least one member of the class consisting of ketones of the formula RCOR', alcohols of the formula R"OH, and esters of the formula $CH_3COOR''$, wherein R and R' are hydrocarbons having 1–2 carbon atoms, R" is a hydrocarbon having 1–3 carbon atoms, said treated compacted solids being subsequently dehydrated to form said desiccant mass.

2. The mass of claim 1 wherein said solvent is acetone.

3. The mass of claim 1 wherein said solvent is methanol.

4. The mass of claim 1 wherein said solvent is ethyl acetate.

5. As a desiccant for a solid propellant, a consolidated desiccant mass which consists essentially of gelatin having a water content of 0–5 weight percent, said mass having been formed from compacted gelatin powder, said compact having been treated with a solution, about 10–40 volume percent water and about 90–60 volume percent acetone, for a time of about 15–45 minutes, in an amount affording about 10–50 weight percent of water, based on said compact, to swell and consolidate said compact, and said consolidated compact having been dehydrated to a water content of 0–5 weight percent.

References Cited by the Examiner

UNITED STATES PATENTS

| | | | |
|---|---|---|---|
| 1,613,362 | 1/1927 | Sheppard et al. | 260—117 |
| 1,896,049 | 1/1933 | Zeigler | 99—130 |
| 2,057,938 | 10/1936 | Crawford. | |
| 2,292,022 | 8/1942 | Christopher | 260—117 |
| 2,834,683 | 5/1958 | Corben et al. | 260—117 |
| 2,851,364 | 9/1958 | Peebles | 99—130 |
| 3,044,254 | 7/1962 | Adelman | 252—194 |

SAMUEL H. BLECH, *Primary Examiner.*

JULIUS GREENWALD, ALBERT T. MEYERS,
*Examiners.*

W. SCHULZ, *Assistant Examiner.*